July 11, 1967 W. O. HARNISH 3,330,495

TAPE REEL

Filed Dec. 6, 1965

INVENTOR
WAYNE O. HARNISH
BY
Carpenter, Kinney & Coulter
ATTORNEYS

United States Patent Office 3,330,495

Patented July 11, 1967

3,330,495

TAPE REEL

Wayne O. Harnish, St. Paul, Minn., assignor to Minnesota Mining and Manufacturing Company, St. Paul, Minn., a corporation of Delaware Filed Dec. 6, 1965, Ser. No. 511,654
6 Claims. (Cl. 242—74.2)

This invention relates to easy threading tape reels and more particularly to insertable tape-gripping attachments that make existing reels easy-threading.

In many conventional reels tape is attached to the reel by inserting it in a thread-up slot in the tape winding surface of the reel hub and turning the reel manually until a layer or two of tape is on the reel. This operation is difficult and time-consuming in itself, but since access to the tape winding surface of the reel hub is through a window in the reel flange, it is even more inefficient. Threading the reel is especially difficult on three- and five-inch diameter magnetic recording tape reels, which have very small flange windows. Such rather small reels are being increasingly used, one principal use being with tape on which personal correspondence is recorded and sent through the mail.

Such a conventional reel is modified according to this invention so that one simple hand motion takes the place of the previous procedure. When a reel that includes an attachment of this invention is used as the take-up reel on a magnetic tape recorder, the tape need only be drawn between the reel flanges and against the hub between two resilient fingers of the attachment. The fingers extend radially from the hub tape winding surface into the tape winding area and are initially spaced slightly less than tape width. After the tape is drawn between the fingers and against the tape winding surface, the recorder may be started at play speed and the tape will immediately wind upon the reel.

In a specific preferred embodiment of this invention, the insertable tape-gripping attachment, or tape-catch, is placed in one of the one or more circular accessory apertures that in some conventional reels extend axially through the reel hub spaced from the central mounting aperture. At least one of the eccentric circular accessory apertures opens laterally as a narrow slot in the hub tape winding surface and conventionally tape is inserted through this slot to attach it to the reel. The accessory openings are also conventionally used to receive a short upstanding pin affixed eccentrically on the rotatable reel support of some magnetic tape recorders to key the reel to the support.

In this specific embodiment of the invention the tape-catch inserted in the reel includes a cylindrical body portion that fits frictionally in the accessory aperture that opens laterally in the hub tape winding surface. The tape-catch also includes a pair of slender, easily-flexed, lightly-resilient, axially-aligned fingers that extend radially from the body portion through the slot in the tape winding surface along and slightly above the opposed inner surfaces of the side flanges. When relaxed, the fingers are spaced apart at the tape winding surface slightly less than the width of tape intended to be wrapped on the reel, and tape inserted between the fingers is held by them. The fingers are easily flexed to the width of such tape when pressed apart by several windings of tape on the reel.

The invention is further illustrated in the drawings in which.

Figure 1:
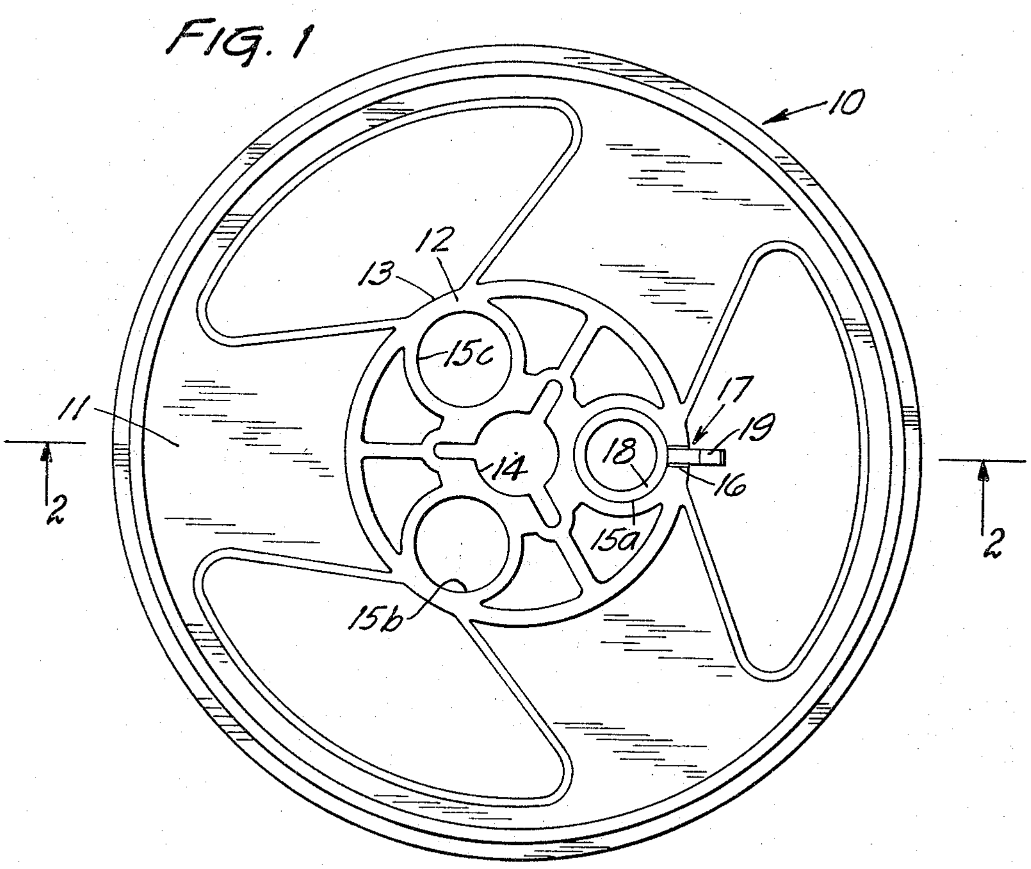
FIGURE 1 is a plan view of a tape reel of this invention.
Figure 2:
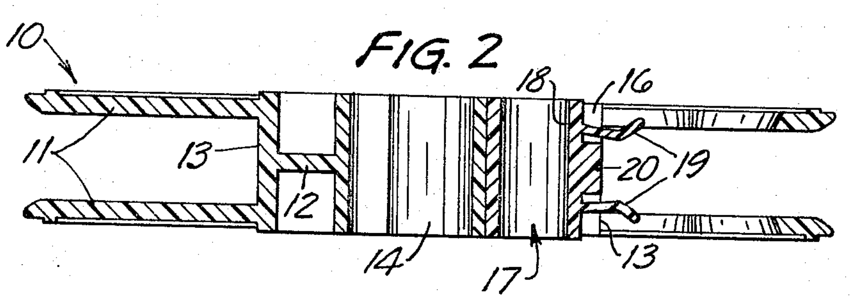
FIGURE 2 is a section along the line 2—2 of FIGURE 1.

The reel 10 shown in FIGURES 1 and 2 includes parallel circular side flanges 11, spaced slightly more than tape width, and a hub 12 having a cylindrical tape winding surface 13. A mounting aperture 14, centrally located in the hub, is defined by interior walls of the hub which also define three accessory apertures 15*a*, 15*b*, and 15*c* spaced laterally from the mounting aperture. One accessory aperture 15*a* opens through the hub rim 13 as a narrow thread-up slot 16.

Figure 3:
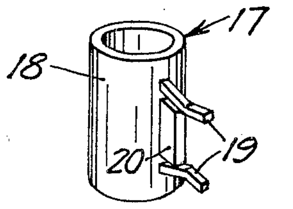
FIGURE 3 is a perspective view of a tape-catch of this invention.

A preferred molded polymeric tape-catch 17, illustrated in perspective in FIGURE 3, is inserted in the reel 10 as shown in FIGURES 1 and 2. The tape-catch 17 includes a tubular body portion 18 from which slender, flexible, resilient fingers 19 extend, and a rectangular protruding rib 20 between the two fingers. The tubular body portion 18 fits frictionally within the accessory aperture 15*a*, retaining the tape-catch in place, while the fingers 19 project through the slot 16. The rib 20 fits snugly in the slot 16 and its outside edge lies substantially in the curved outside surface of the tape winding surface 13 so that the rib makes the tape winding surface of the hub substantially continuous. The modified reel accordingly eliminates a source of tape distortion that exists with conventional reels in which a slot is provided for the lead end of tape.

The fingers 19 should be free-standing for a length that extends radially inwardly of the hub tape winding surface 13 and should be slightly thinner than the slot 16, so that they may be flexed at the tape winding surface a significant amount out of their normal position. In the tape-catch illustrated, the fingers are spaced from each other at the point of their connection to the tubular portion 18 a distance slightly greater than tape width. They taper toward one another so that at the tape winding surface they are spaced less than the width of tape, being desirably spaced at least about 5 mils less than tape width. It is preferred that the fingers taper toward one another rather than have a uniform spacing, since they then turn the edges of the first winding of tape in and accordingly have a greater part of their surface in contact with tape. Also, the fingers have been found to recover a useful position more quickly when originally canted.

The fingers are preferably flared apart at their extreme ends to facilitate passage of tape between them. They should be easily flexed and lightly resilient so as to exert a light pressure on tape drawn between them. The greater the coefficient of friction of their tape-engaging surface with typical tape materials, the more consistent will be the tape-gripping action.

The body portion 18 may have any shape by which the tape-catch may be effectively retained in a particular reel. Various materials have utility in forming the catch, but it is especially adapted to being molded in one piece from polymeric material, such as a flexible vinyl or similar material.

In a preferred molded polymeric construction as illustrated in the drawings, the tape-catch is made from a soft, flexible copolymer of ethylene and ethyl acrylate (Zetafin, made by Dow Chemical Co.). The cylindrical body portion 18 has a height of 0.50 inch and a diameter of 0.358 inch and the bore through it has a diameter of 0.25 inch. The rib 20 has a thickness of 0.060 inch, a height of 0.055 inch, and a length of 0.17 inch. The fingers 19 have a width of 0.050 inch and a thickness between the point of attachment to the body portion 18 and the point where the flare of 0.045 inch and from the point of flaring a thickness of 0.031 inch. At their point of attachment to the body portion 18 they are spaced about 0.256 inch. From the body portion the fingers taper inwardly at about a 6 degree angle for about 0.12 inch of length and at their closest point are 0.232 inch apart.

The fingers flare out at an angle of about 30° and have an overall length of 0.218 inch.

What is claimed is:

1. An easy-threading tape reel for predetermined tape comprising parallel circular side flanges attached to a hub having a cylindrical tape winding surface and interior walls which define a central mounting aperture and at least one second aperture spaced from the mounting aperture that opens laterally as a narrow axial slot in the hub tape winding surface, and a tape-catch including a body portion retained in said second aperture and a pair of slender easily-flexed lightly-resilient axially-aligned fingers that extend from the body portion radially through the slot in the tape winding surface along and slightly above the opposed inner surfaces of the side flanges and which when relaxed are spaced apart at the tape winding surface slightly less than tape width so as to resiliently grip tape wound on the reel.

2. An easy-threading tape reel for predetermined tape comprising parallel circular side flanges attached to a hub having a cylindrical tape winding surface and interior walls which define a central mounting aperture and at least one circular aperture through the hub spaced from the central mounting aperture that opens laterally as a narrow axial slot in the cylindrical tape winding surface, and a molded polymeric tape-catch including a cylindrical body portion frictionally retained within the circular aperture and a pair of slender easily-flexed lightly-resilient axially-aligned fingers extending radially from the body portion through the axial slot along and slightly above the opposed inner surfaces of the side flanges, the connection of the fingers to the body portion being radially inwardly of the tape winding surface whereby the fingers may be spread at the tape winding surface to the width of predetermined tape, and the fingers when relaxed being spaced apart at the tape winding surface slightly less than tape width so as to resiliently grip tape wound on the reel.

3. A tape reel as described in claim 2 in which the fingers taper toward one another from the point of their connection to the cylindrical body portion and flare apart at their tips to a spacing wider than tape width.

4. A molded polymeric tape-catch for insertion in predetermined tape reels to make them easy-threading, a predetermined reel including parallel circular side flanges attached to a hub having a cylindrical tape winding surface and interior walls which define a central mounting aperture and at least one circular aperture through the hub spaced from the central mounting aperture that opens laterally as a narrow axial slot in the tape winding surface, and the tape-catch comprising a cylindrical body portion that fits frictionally within said circular aperture and a pair of slender easily-flexed lightly-resilient axially-aligned fingers that extend radially from the body portion and are adapted to extend through the axial slot along and slightly above the opposed inner surfaces of the side flanges of a predetermined reel, the fingers when relaxed being spaced apart slightly less than tape width at least at a point outwardly on the fingers whereby the fingers resiliently grip initial layers of tape wound on the tape winding surface of a predetermined reel.

5. A tape-catch as described in claim 4 in which the fingers taper toward one another from the point of their connection to the cylindrical body portion and flare apart at their tips to a spacing wider than tape width.

6. A tape-catch as described in claim 4 that includes a rectangular protruding rib between the fingers that substantially fills the axial slot in the tape winding surface of a predetermined reel.

References Cited

UNITED STATES PATENTS

| | | | |
|---|---|---|---|
| 1,861,882 | 6/1932 | Ross | 242—74.2 |
| 1,861,891 | 6/1932 | Wittel | 242—74.2 |

FRANK J. COHEN, *Primary Examiner.*

N. L. MINTZ, *Assistant Examiner.*